US009752624B2

(12) United States Patent
Huegerich

(10) Patent No.: US 9,752,624 B2
(45) Date of Patent: Sep. 5, 2017

(54) TRACTOR/IMPLEMENT PTO CONNECTION MECHANISM

(71) Applicant: Deere & Company, Moline, IL (US)

(72) Inventor: Tony J. Huegerich, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 310 days.

(21) Appl. No.: 14/520,961

(22) Filed: Oct. 22, 2014

(65) Prior Publication Data

US 2016/0115999 A1    Apr. 28, 2016

(51) Int. Cl.
| | |
|---|---|
| B60K 17/28 | (2006.01) |
| F16D 1/116 | (2006.01) |
| F16D 1/02 | (2006.01) |
| A01B 71/06 | (2006.01) |
| F16D 1/10 | (2006.01) |

(52) U.S. Cl.
CPC ............... *F16D 1/02* (2013.01); *A01B 71/06* (2013.01); *F16D 1/10* (2013.01); *B60K 17/28* (2013.01)

(58) Field of Classification Search
CPC ......... Y10T 403/7026; Y10T 403/7028; Y10T 403/7032; Y10T 403/7033; Y10T 403/7035; F16D 1/06; F16D 1/10; F16D 2001/103; B60K 17/28; B60K 25/06; A01D 69/002
USPC .................. 403/359.1; 74/11, 15.6
See application file for complete search history.

(56) References Cited

U.S. PATENT DOCUMENTS

| | | | |
|---|---|---|---|
| 2,429,761 A | 10/1947 | Ketel | |
| 3,260,541 A | 7/1966 | Sadler et al. | |
| 3,350,960 A * | 11/1967 | Lamburn | B60K 17/08 475/136 |

(Continued)

FOREIGN PATENT DOCUMENTS

| | | | |
|---|---|---|---|
| CN | 102684377 A | * | 9/2012 |
| EP | 2676534 B1 | | 12/2013 |

(Continued)

OTHER PUBLICATIONS

GDS GmbH, GANGL Docking System, product description web page, retrieved Oct. 8, 2014 from http://www.ganglsystems.com/en/product/.

(Continued)

*Primary Examiner* — Joshua J Michener
*Assistant Examiner* — Kyle Walraed-Sullivan

(57) ABSTRACT

A connection mechanism is provided for connecting an implement to a tractor PTO. The connection mechanism includes a PTO stub shaft, a coupler frame, an adapter holder, a PTO adapter shaft, and a resilient member. The coupler frame is adapted to be attached to the implement. The adapter holder is mounted to the coupler frame and is pivotal and slidable with respect to the coupler frame. The adapter holder receives and rotatably supports the PTO adapter shaft. The PTO adapter shaft has adapter splines. The PTO stub shaft has stub splines for meshing engagement with the adapter splines. The resilient member is coupled between the coupler frame and the adapter holder, and is biased to urge the adapter holder and the PTO adapter shaft towards the PTO stub shaft.

12 Claims, 6 Drawing Sheets

(56) References Cited

U.S. PATENT DOCUMENTS

| | | | |
|---|---|---|---|
| 3,651,907 A * | 3/1972 | Myer, Sr. | F16D 41/22 192/108 |
| 3,926,532 A * | 12/1975 | Schlenker | F16D 1/116 403/322.2 |
| 4,271,942 A * | 6/1981 | Ballendux | B60K 17/28 192/48.91 |
| 4,287,778 A * | 9/1981 | Quick | B60K 17/28 192/48.614 |
| 4,344,305 A * | 8/1982 | Holmes | F16D 1/02 403/325 |
| 4,368,899 A | 1/1983 | Smalley et al. | |
| 4,523,871 A * | 6/1985 | Recker | F16D 1/116 403/12 |
| 4,738,463 A | 4/1988 | Poore et al. | |
| 4,763,743 A | 8/1988 | Ridgway | |
| 5,070,982 A * | 12/1991 | Pitchford | B60K 17/28 192/69.9 |
| 5,655,968 A * | 8/1997 | Burton | F16C 3/03 277/562 |
| 5,667,330 A * | 9/1997 | Henkel | A01B 71/06 403/328 |
| 5,743,670 A * | 4/1998 | Ader | E04B 1/6137 403/11 |
| 5,779,385 A * | 7/1998 | Fechter | F16D 1/116 403/325 |
| 5,903,965 A * | 5/1999 | Fletcher | B29C 41/14 264/134 |
| 5,938,558 A * | 8/1999 | Eybergen | F16H 48/08 403/375 |
| 6,062,321 A | 5/2000 | Defrancq | |
| 6,142,274 A * | 11/2000 | Warner | B60K 17/28 192/12 C |
| 6,260,682 B1 * | 7/2001 | Rang | B60K 17/28 192/70.19 |
| 6,308,588 B1 * | 10/2001 | Zubik | A01B 71/06 464/160 |
| 6,497,313 B1 * | 12/2002 | Blalock | B60K 17/28 192/18 A |
| 6,634,078 B1 * | 10/2003 | Breese | B21H 5/02 29/527.1 |
| 7,290,977 B2 | 11/2007 | Albright et al. | |
| 7,510,064 B2 * | 3/2009 | Graves | F16D 25/082 192/110 B |
| 7,717,189 B2 | 5/2010 | Shoup | |
| 8,372,121 B2 * | 2/2013 | Capote | A61B 17/7091 606/246 |
| 8,770,612 B2 | 7/2014 | Wendte et al. | |
| 2002/0025219 A1 * | 2/2002 | Horikawa | B30B 15/10 403/359.1 |
| 2003/0136212 A1 * | 7/2003 | Allen | F16H 55/18 74/460 |
| 2005/0258012 A1 * | 11/2005 | Graves | F16D 59/02 192/15 |
| 2007/0074876 A1 * | 4/2007 | Pietras | E21B 19/06 166/379 |
| 2007/0104535 A1 * | 5/2007 | Valovick | F16C 3/03 403/359.1 |
| 2007/0264077 A1 * | 11/2007 | Kitahata | F16D 3/06 403/359.1 |
| 2008/0115983 A1 * | 5/2008 | Priepke | A01B 71/063 180/53.3 |
| 2008/0148883 A1 * | 6/2008 | Prampolini | F16H 55/18 74/15.86 |
| 2008/0261745 A1 * | 10/2008 | Paul | B60K 17/28 475/207 |
| 2009/0266669 A1 * | 10/2009 | Vergara | B60K 17/28 192/12 B |
| 2010/0240464 A1 * | 9/2010 | Schafer | F16D 1/06 464/182 |
| 2011/0001400 A1 * | 1/2011 | Chiba | B60K 6/40 310/67 R |
| 2011/0108352 A1 * | 5/2011 | Haggerty | B60K 17/165 180/348 |
| 2011/0232979 A1 * | 9/2011 | Schulz | B60K 17/28 180/53.6 |
| 2012/0068438 A1 | 3/2012 | Kollath | |
| 2012/0180596 A1 * | 7/2012 | Fox | F16H 48/22 74/650 |
| 2013/0133905 A1 | 5/2013 | Valet | |
| 2013/0252748 A1 * | 9/2013 | Sugiyama | F16C 1/04 464/162 |
| 2013/0252749 A1 * | 9/2013 | Creek | F16D 3/06 464/181 |
| 2013/0277943 A1 | 10/2013 | Wendte et al. | |
| 2013/0303326 A1 * | 11/2013 | Downs | F16H 48/22 475/221 |
| 2013/0305851 A1 * | 11/2013 | Rees | F16D 11/14 74/15.8 |
| 2013/0343815 A1 * | 12/2013 | Kenawy | F16D 1/101 403/359.1 |
| 2014/0102227 A1 * | 4/2014 | Mayer | F16D 25/123 74/11 |
| 2014/0102228 A1 * | 4/2014 | Mayer | B60K 17/28 74/15.82 |
| 2014/0165748 A1 * | 6/2014 | Alford | B60K 17/28 74/11 |
| 2015/0000432 A1 * | 1/2015 | Bordwell | B60K 17/28 74/15.86 |
| 2015/0075897 A1 * | 3/2015 | Copeland | B60K 17/22 180/383 |
| 2015/0107382 A1 * | 4/2015 | Chang | D06F 17/08 74/17 |
| 2015/0367728 A1 * | 12/2015 | Neumann | B60K 25/02 74/15.6 |

FOREIGN PATENT DOCUMENTS

| | | |
|---|---|---|
| FR | 2995756 A1 | 3/2014 |
| GB | 757399 A | 9/1956 |
| WO | 2010026183 A2 | 3/2010 |

OTHER PUBLICATIONS

European Search report issued in counterpart application No. 15187534.1, dated Mar. 10, 2016 (6 pages).

* cited by examiner

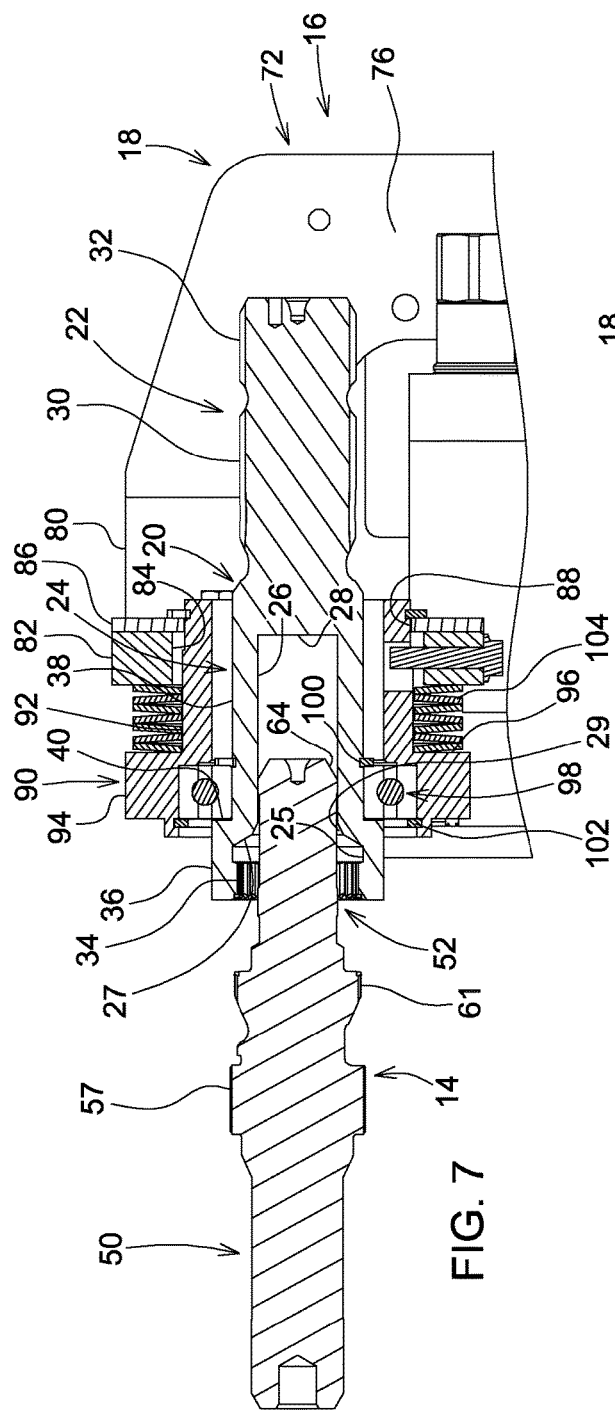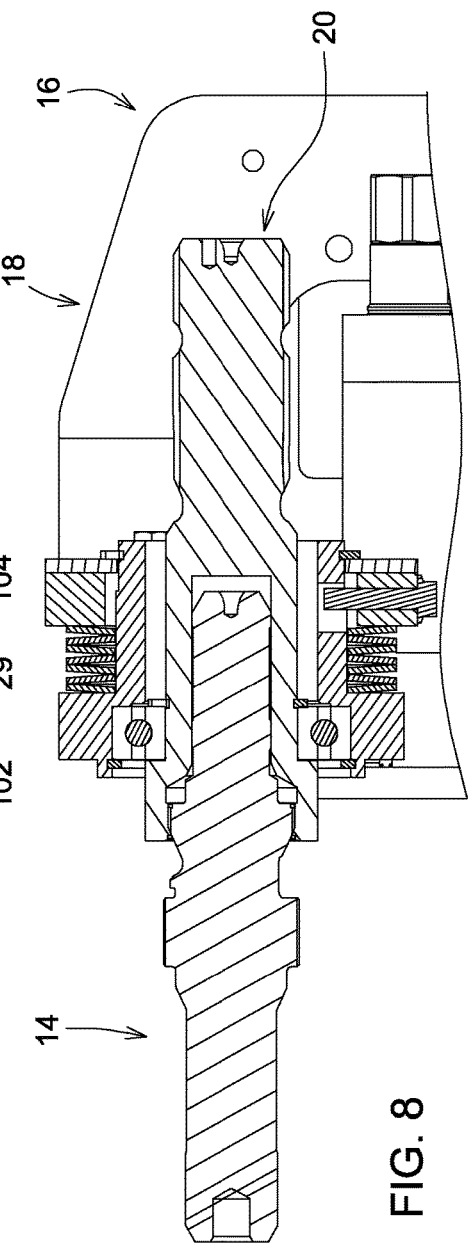
FIG. 7
FIG. 8

TRACTOR/IMPLEMENT PTO CONNECTION MECHANISM

FIELD

The present disclosure relates to a connection mechanism for connecting a tractor power take off to an implement propeller shaft.

BACKGROUND

Tractors and utility vehicles used for agricultural work may be coupled to implements which have a propeller shaft which must be connected to the tractor power take off (PTO) shaft. Implements are not utilized full time with a tractor, so it is desirable that a coupling mechanism allow quick, easy removal and reinstallation of the implement. A tractor PTO shaft may be connected and secured to a propeller shaft on the implement using PTO coupling members. PTO shafts take time to hook up and can be difficult because of their size and location. An automatic connection mechanism is needed for an implement that can be quickly and easily connected and disconnected under a tractor. A PTO coupling is needed that can reduce the difficulty of securing a tractor PTO to a propeller shaft on the implement.

SUMMARY

According to an aspect of the present disclosure, a connection mechanism is provided for connecting an implement to a tractor power take off (PTO). The connection mechanism includes a PTO adapter shaft, a PTO stub shaft, a coupler frame, an adapter holder and a resilient member. The PTO adapter shaft is mounted to the implement and has internal adapter splines. The PTO stub shaft has external stub splines for meshing engagement with the adapter splines. The coupler frame is adapted to be attached to the implement. The adapter holder is mounted to the coupler frame and is movable with respect to the coupler frame. The adapter holder receives and rotatably supports the PTO adapter shaft. The resilient member is coupled between the coupler frame and the adapter holder, and is biased to urge the adapter holder and the PTO adapter shaft towards the PTO stub shaft.

The adapter shaft has a first bore forming the adapter splines and has a second bore extending from the first bore to an end wall which faces towards the first bore. The first bore has a larger diameter and the second bore has a smaller diameter. The stub shaft has a first portion forming the stub splines externally thereon, and has a second portion extending away from the first portion. The first portion has a larger diameter and the second portion has a smaller diameter. The second portion has an outer end with a chamfer, and has first and second journals formed thereon. The first journal is spaced axially apart from the second journal. The first and second journals are slidably received by the second bore.

The adapter holder pivotally and slidably engages a portion of the coupler frame. The adapter holder has a smaller diameter hollow main body and has a larger diameter hollow front flange which forms an annular wall which engages the resilient member. The resilient member is mounted around the main body of the adapter holder.

With this connection mechanism, the operator can leave the adaptor shaft connected to the standard PTO shaft of the implement. The adapter shaft can easily be connected to the stub shaft that replaces the standard PTO shaft on the tractor.

BRIEF DESCRIPTION OF THE DRAWINGS

FIG. 7 is a sectional view of the coupling assembly in a partially assembled condition;

FIG. 8 is a sectional view of the coupling assembly in a fully assembled condition.

DETAILED DESCRIPTION OF THE DRAWINGS

Figure 1:
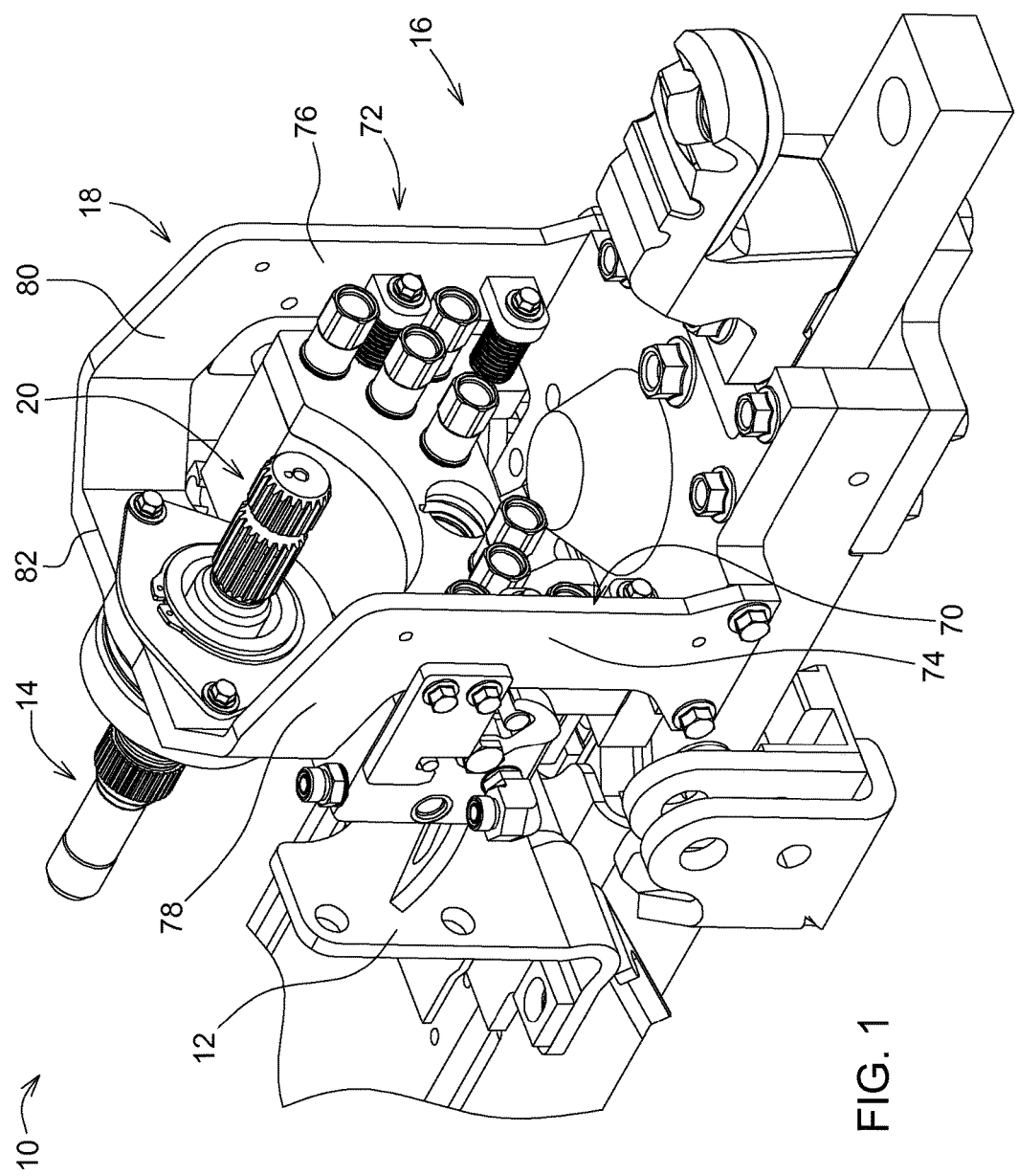
FIG. 1 is a perspective view of a tractor-implement coupling assembly embodying the invention.
Figure 2:
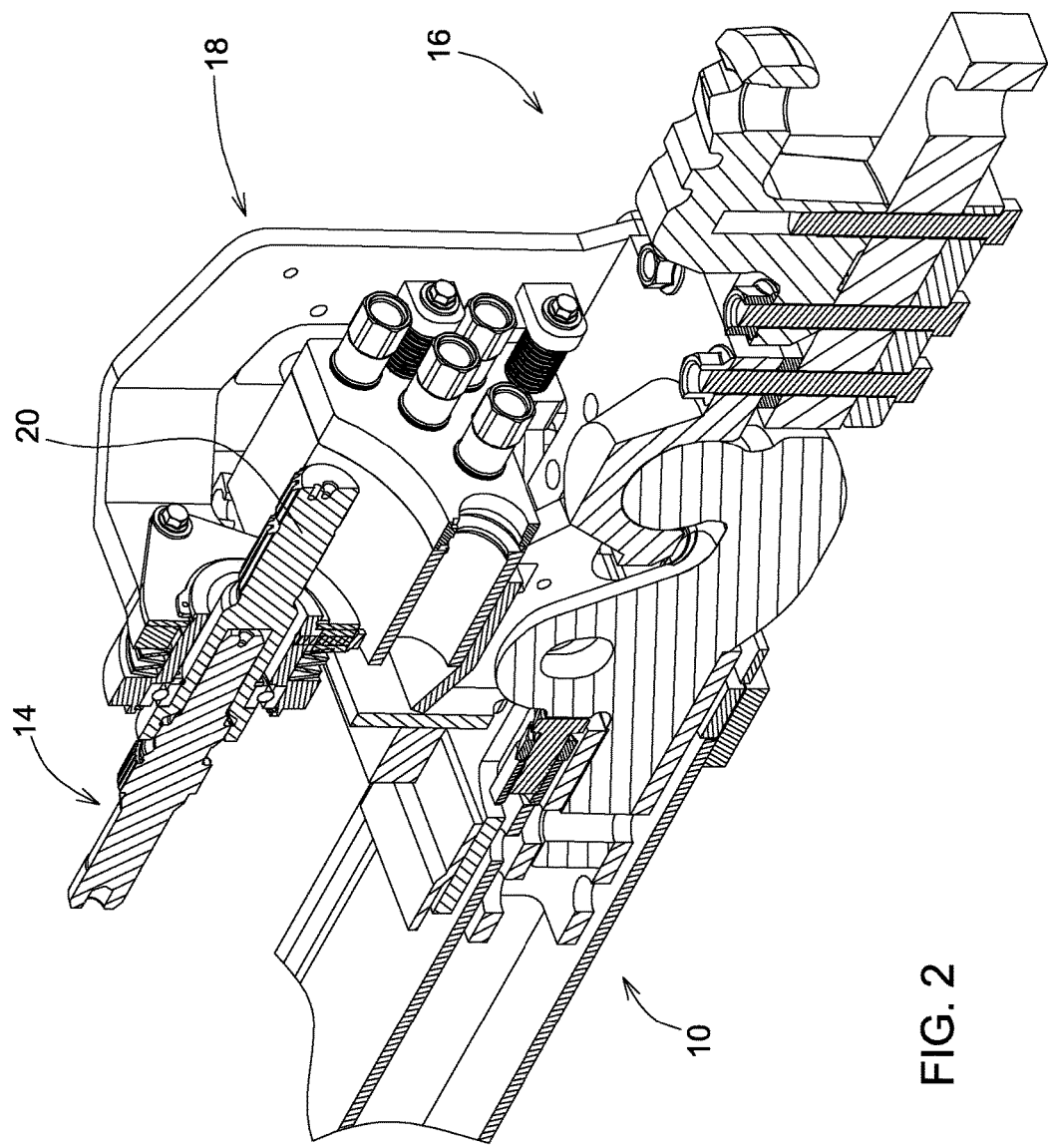
FIG. 2 is a sectional perspective view of the coupling assembly of FIG. 1.

Referring to FIGS. 1 and 2, a tractor pickup drawbar 10 includes a frame 12 which rotatably supports a power take off (PTO) stub shaft 14. The stub shaft 14 is adapted to be rotatably driven by the tractor power take off (PTO) drive (not shown). The pickup drawbar 10 is 30 coupled to a coupler unit 16 which is mounted on the implement (not shown). The coupler unit 16 has a coupler frame or housing 18 which rotatably supports a propeller shaft or PTO adapter shaft 20.

Figure 3:
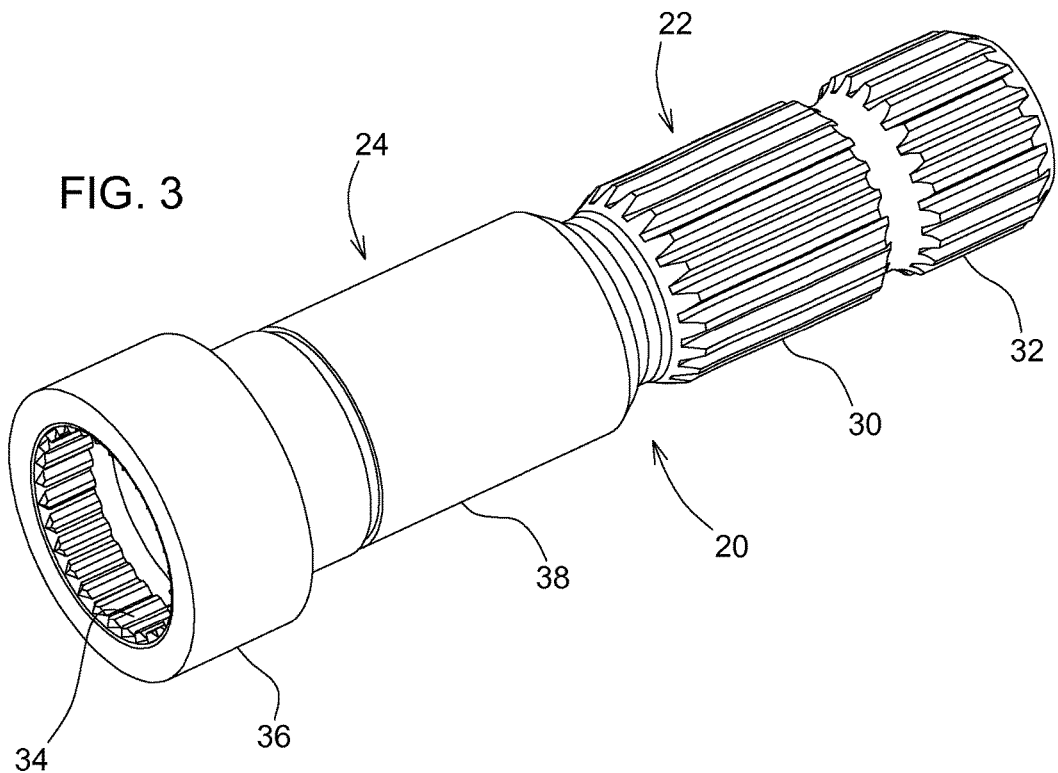
FIG. 3 is a perspective view of the propeller shaft of FIG. 1.
Figure 5:
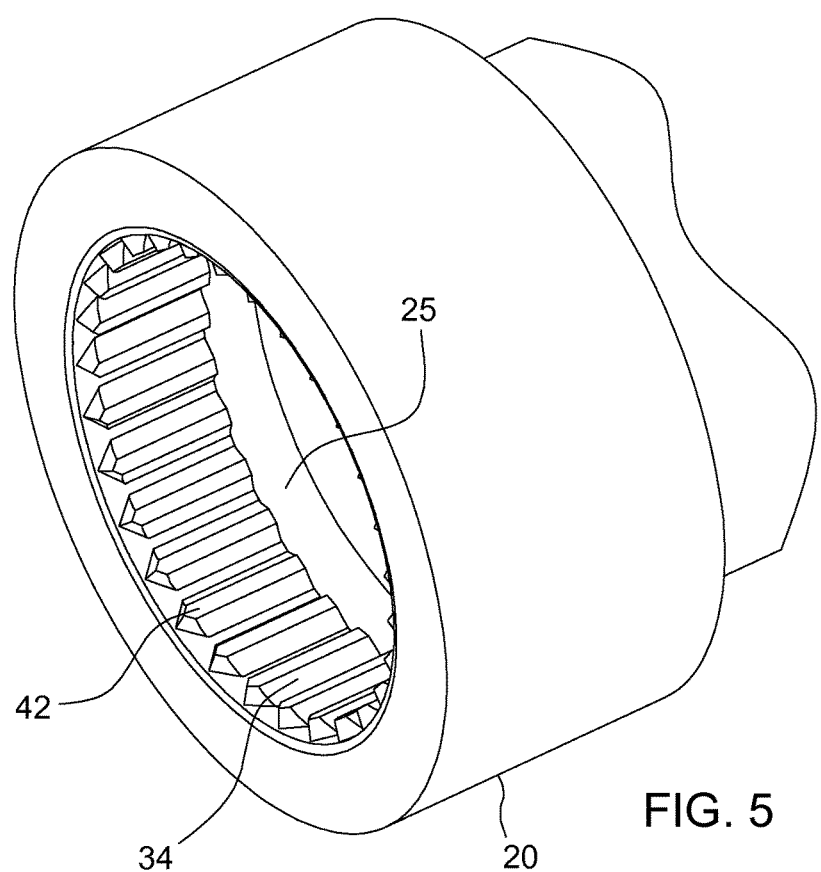
FIG. 5 is an enlarged perspective view of the splined portion of the propeller shaft of FIG. 1.

As best seen in FIGS. 3, 5 and 7, the adapter shaft 20 has a solid output end 22 and a hollow input end 24 penetrated by a first bore 25 and a second blind bore 26. Bore 26 extends away from PTO stub shaft 14 to an end wall 28 which faces towards the PTO stub shaft 14. External splines 30 and 32 are formed on the output end 22. First bore 25 forms internal splines 34. The second bore 26 extends from the first bore 25 to the end wall 28. The first bore 25 has a larger diameter and the second bore 26 has a smaller diameter. Input end 24 has a larger diameter end portion 36 joined to a smaller diameter portion 38 by an annular wall 40 which faces away from PTO stub shaft 14. As best seen in FIG. 5, each spline 34 has an outer end 42 which is tapered. As best seen in FIG. 7, first bore 25 is connected to second bore by an outer frustoconical wall or tapered bore portion 27 and an inner frustoconical wall or tapered bore portion 29.

Figure 4:
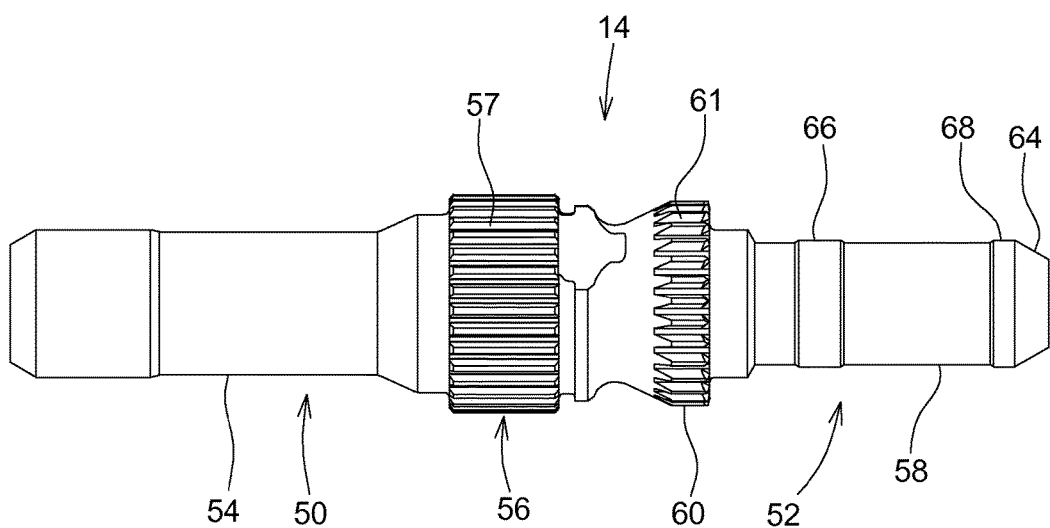
FIG. 4 is a perspective view of the PTO stub shaft of FIG. 1.
Figure 6:
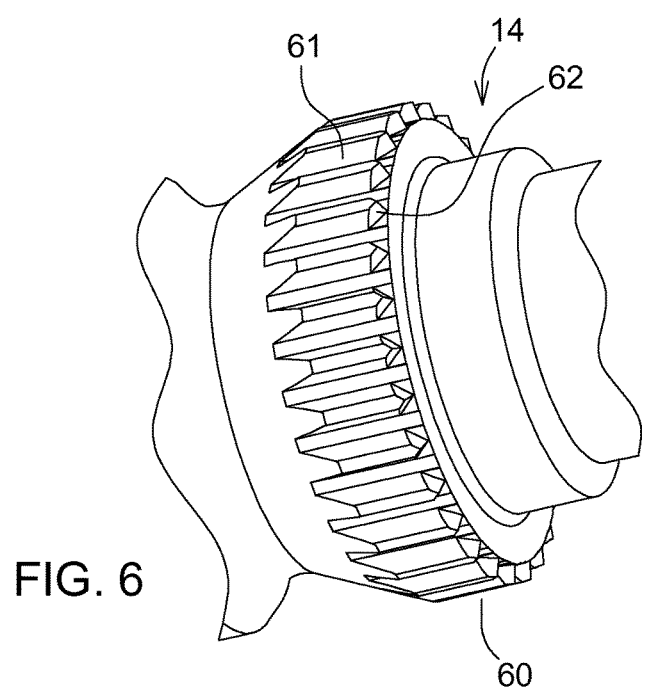
FIG. 6 is an enlarged perspective view of the splined portion of the PTO stub shaft of FIG. 1.

As best seen in FIGS. 2, 4 and 6, the PTO stub shaft 14 has a solid input portion 50 and a solid output portion 52. Input portion 50 includes a smaller diameter shaft portion 54 which extends outwardly and away from a larger diameter portion 56 with splines 57. Output portion 52 includes a smaller diameter shaft portion 58 which extends outwardly and away from and a larger diameter portion 60 with splines 61. As best seen in FIG. 6, each spline 61 has an outer end 62 which is tapered. A chamfer 64 is formed on the outer end of shaft portion 58. The chamfer 64 can engage the tapered wall portions 27 and 29 to help align and guide the PTO stub shaft 14 into the PTO adapter shaft 20. As best seen in FIG. 4, the smaller diameter shaft portion 58 includes first and second journals 66 and 68 formed thereon. The first journal 66 is spaced axially apart from the second journal 68 which is adjacent the chamfer 64. The first and second journals 66 and 68 are slidably received by the second bore 26 of the PTO adapter shaft 20.

Figure 9:
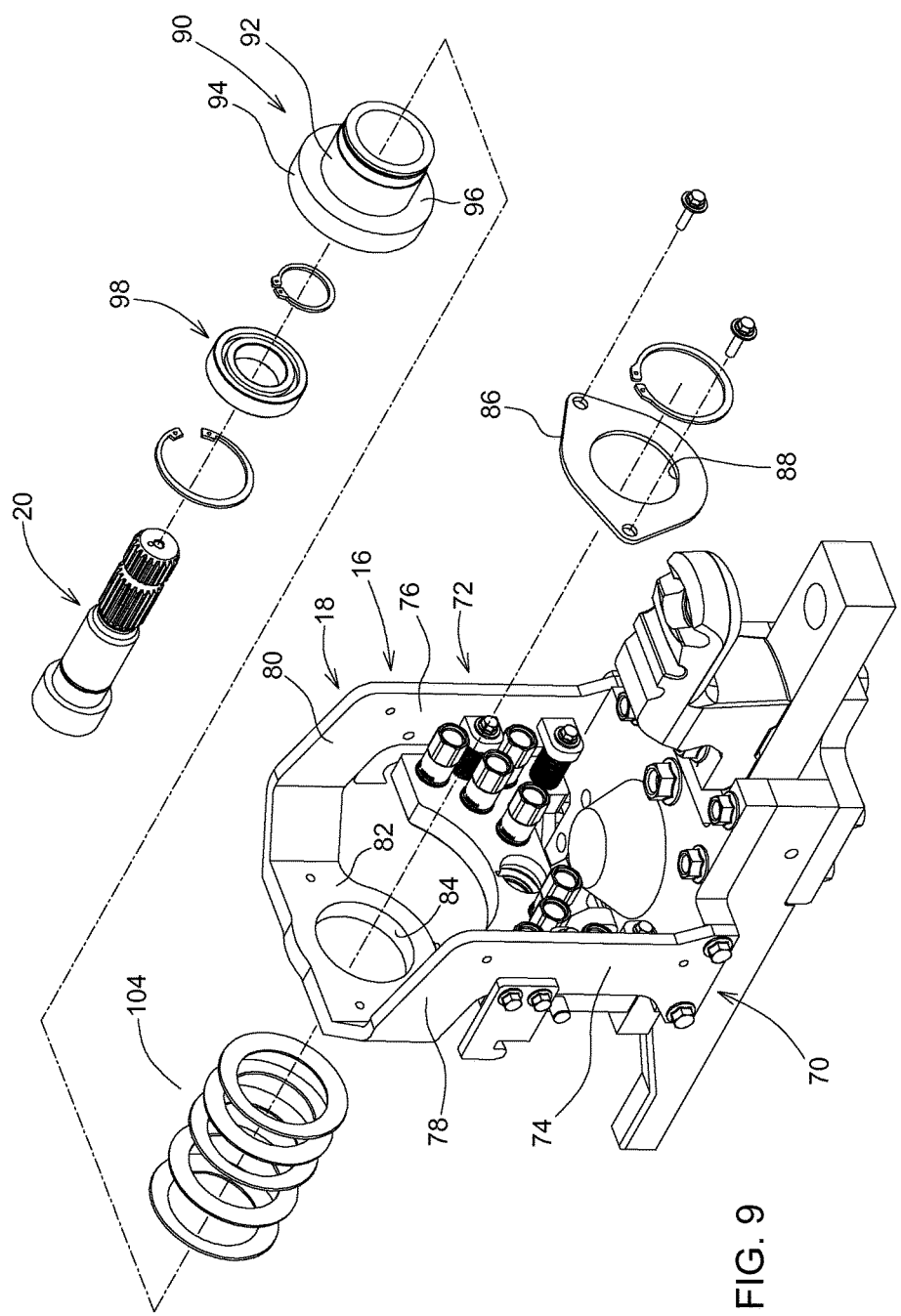
FIG. 9 is an exploded perspective view of a portion of FIG. 2.

Referring now to FIGS. 1, 7 and 9, the housing 18 includes a pair of side plates 70 and 72 with vertical legs 74 and 76, and with upper legs 78 and 80, each projecting forwardly from an upper end of the corresponding leg 74, 76. A center leg 82 extends between and is supported by the forward ends of legs 78 ad 80. Center leg 82 includes a circular opening 84. A retainer plate 86 is attached to a rear side of center leg 82. Retainer plate 86 includes an opening 88 which is slightly smaller than opening 84.

A hollow cylindrical holder 90 is received by the opening 88 and slidably and pivotally engages the retainer plate 86. Holder 90 includes a smaller diameter main body 92 and a larger diameter front flange 94 which forms a rearwardly facing annular wall 96. The PTO adapter shaft 20 is received by the holder 90 and supported within the holder 90 by annular bearing 98. Bearing 98 is held between wall 40 and a snap ring 100. A snap ring 102 retains the bearing 98 within the holder 90. Thus, the PTO adapter shaft 20 is fixed axially with respect to the holder 90, but it can rotate within the holder 90. Because opening 88 is slightly smaller than opening 84, the holder 90 and the PTO adapter shaft 20 are allowed to move radially with respect to the coupler housing 18 to aid in self-aligning the PTO adapter shaft 20 with respect to the PTO stub shaft 14. As a result, the adapter holder 90 and the PTO adapter shaft 20 are pivotal with respect to the housing 18 in directions perpendicular with respect to an axis of the PTO adapter shaft 20.

An annular resilient member 104, such as a stack of annular Belleville springs, is mounted around the main body 92 between wall 96 and center leg 82. Resilient member 104 is biased to urge the holder 90 and the PTO adapter shaft 20 towards the PTO stub shaft 14.

To use this connection mechanism, the standard PTO shaft (not shown) on a tractor is replaced with by the PTO stub shaft 14. The two tightly toleranced journals 66, 68 and generous chamfer 64 and surfaces 27 and 29 allow the PTO adapter shaft 20 to slide on the journals and align the PTO adaptor shaft 20 with the stub shaft 14. The PTO adaptor shaft 20 has a bore 26 with a tight tolerance and is mounted in the frame 18 on an implement socket used with a production pick up hitch 10. The pickup hitch 10 pulls in the PTO adapter shaft 20 towards the tractor stub shaft 14. The PTO adapter shaft 20 is allowed to float in the frame 18 so that it can be coaxially aligned with the stub shaft 14. The final step is to engage the splines 61 on the stub shaft 14 with the splines 34 in the PTO adaptor shaft 20. The splines have tapered ends to prevent a tooth 30 butting condition. Since the two shafts are concentric due to the journals 66, 68, indexing the splines is very easy. If the splines were not to index, the Belleville springs 104 will compress to prevent damage. Once rotation has started, the springs 104 will force the PTO adapter shaft 20 onto the stub shaft 14.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A connection mechanism for connecting an implement to a tractor power take-off (PTO), comprising:
   a PTO adapter shaft mounted to the implement, the PTO adapter shaft having a first bore forming internal splines and having a second bore extending from the first bore to an end wall which faces towards the first bore, the first bore having a diameter that is greater in size than that of the second bore;
   a PTO stub shaft, the PTO stub shaft having a first portion forming external splines for meshing engagement with the internal splines, and having a second portion extending away from the first portion, the first portion having a diameter that is greater in size than that of the second portion, the second portion having an outer end with a chamfer, and the second portion having first and second journals formed thereon, the first journal being spaced axially apart from the second journal, the first and second journals being slidably received by the second bore
   a coupler frame adapted to be attached to the implement; and
   an adapter holder mounted to the coupler frame, wherein the adapter holder has a hollow main body and a hollow front flange which forms an annular wall which engages a resilient member that is coupled between the coupler frame and the adapter holder, and wherein the resilient member is mounted around the hollow main body of the adapter holder.

2. The connection mechanism of claim 1, wherein: the first bore is connected to the second bore by a frustoconical wall.

3. The connection mechanism of claim 1, wherein: the first bore is connected to the second bore by an outer frustoconical wall and an inner frustoconical wall.

4. The connection mechanism of claim 1, wherein: the internal splines have tapered ends which face the external splines; and the external splines have tapered ends which face the internal splines.

5. The connection mechanism of claim 1, wherein: the adapter holder and the PTO adapter shaft are slidable with respect to the coupler frame along an axis of the PTO adapter shaft; and the resilient member is biased to urge the adapter holder and the PTO adapter shaft towards the PTO stub shaft.

6. The connection mechanism of claim 1, wherein: the adapter holder and the PTO adapter shaft are pivotal with respect to the coupler frame in directions perpendicular with respect to an axis of the PTO adapter shaft; and the resilient member is biased to urge the adapter holder and the PTO adapter shaft towards the PTO stub shaft.

7. The connection mechanism of claim 1, wherein: the adapter holder and the PTO adapter shaft are slidable and pivotal with respect to the coupler frame in directions perpendicular with respect to an axis of the PTO adapter shaft; and the resilient member is biased to urge the adapter holder and the PTO adapter shaft towards the PTO stub shaft.

8. The connection mechanism of claim 1, wherein:
   the adapter holder receives and rotatably supports the PTO adapter shaft, the adapter holder and the PTO adapter shaft being movable with respect to the coupler frame; and wherein
   the resilient member is biased to urge the adapter holder and the PTO adapter shaft towards the PTO stub shaft.

9. A connection mechanism for connecting an implement to a tractor power take-off (PTO), comprising:

a PTO adapter shaft mounted to the implement, the PTO adapter shaft having adapter splines;
a PTO stub shaft, the PTO stub shaft having stub splines for meshing engagement with the adapter splines;
a coupler frame adapted to be attached to the implement; and
an adapter holder mounted to the coupler frame, the adapter holder receiving and rotatably supporting the PTO adapter shaft, the adapter holder and the PTO adapter shaft being movable with respect to the coupler frame; and
a resilient member coupled between the coupler frame and the adapter holder, the resilient member being biased to urge the adapter holder and the PTO adapter shaft towards the PTO stub shaft,
wherein the adapter holder has a hollow main body and a hollow front flange which forms an annular wall which engages the resilient member, and wherein the resilient member is mounted around the hollow main body of the adapter holder,
wherein the PTO adapter shaft has a first bore forming the adapter splines and has a second bore extending from the first bore to an end wall which faces towards the first bore, the first bore having a diameter that is greater in size than that of the second bore; and the PTO stub shaft has a first portion forming the stub splines externally thereon, and has a second portion extending away from the first portion, the first portion having a diameter that is greater in size than that of the second portion h, the second portion having an outer end with a chamfer, and the second portion having first and second journals formed thereon, the first journal being spaced axially apart from the second journal, the first and second journals being slidably received by the second bore.

10. The connection mechanism of claim 9, wherein: the adapter holder pivotally and slidably engages a portion of the coupler frame.

11. The connection mechanism of claim 9, wherein: the first bore is connected to the second bore by a frustoconical wall.

12. The connection mechanism of claim 9, wherein: the first bore is connected to the second bore by an outer frustoconical wall and an inner frustoconical wall.

* * * * *